Aug. 27, 1968

C. BRICOUT 3,398,726

INTERNAL COMBUSTION ENGINES OF THE TYPE INCLUDING A HEAT
INSULATED COMBUSTION CHAMBER

Filed Feb. 1, 1966

Inventor
Constant Bricout
by:
Elvin E. Greigg

United States Patent Office 3,398,726
Patented Aug. 27, 1968

3,398,726
INTERNAL COMBUSTION ENGINES OF THE TYPE INCLUDING A HEAT INSULATED COMBUSTION CHAMBER
Constant Bricout, Paris, France, assignor to Les Applications Techniques Industrielles (L.A.T.I.), Paris, France, a French civil company
Filed Feb. 1, 1966, Ser. No. 524,208
Claims priority, application France, Feb. 8, 1965, 4,783
6 Claims. (Cl. 123—32)

ABSTRACT OF THE DISCLOSURE

In an internal combustion engine a combustion chamber disposed above the cylinder in a bore of the cylinder head and thermally substantially insulated therefrom, heat conducting means thermally connecting the outer wall of the chamber with the inner wall of the bore to control the temperature in said heat-insulated combustion chamber in a predetermined manner.

---

The present invention has for its object improvements adapted to increase the total thermic efficiency of internal combustion engines, of the type wherein the combustion chamber is separated from the cylinder and wherein the fuel begins burning before the burnt gases reach, after a combustion as complete as possible, the actual cylinder with which said chamber communicates through a transfer port.

The efficiency of the engine is a function of the ratio between the number of calories transformed into work and the total number of calories supplied by the fuel; the difference between the two figures corresponds to the losses of heat and is exhausted into the atmosphere through radiation, through the lubricating oil, through the cooling water and through the exhaust gases and it is obvious that, in order to increase the efficiency, said losses should be reduced as much as possible.

An approximate solution of this problem consists in resorting to a combustion chamber which is thermally separated from the adjacent sections of the engine. The heat produced by the combustion remains almost entirely stored within the walls of the chamber, so as to be partly returned during the following cycle into the combustion chamber. Such an arrangement shows furthermore the advantage of providing a temperature inside the chamber at the end of the compressional stroke, which is higher than that found in conventional engines, which allows reducing the volumetric compression ratio, that is reducing the negative work during the cycle and consequently still further increasing the efficiency.

However, such a solution leads to a general increase in temperature during the cycle and consequently to an increase in the temperature at the exhaust. Thus a fraction of the saving of heat provided in the other circuits in which heat is lost is compensated for by the loss of heat carried away by the exhaust gases, which leads to a still further increase in the temperature during the following cycle and consequently limits the improvement in the efficiency.

On the other hand, the temperature inside the heat insulated chamber and, more particularly, in the vicinity of the heat focalizing points remains very high at the end of the operative cycle. At the moment of the injection of fuel into such a superheated medium, droplets of fuel are carbonized and peroxides are formed at the surface of said droplets, and act as insulating coats preventing complete combustion of the fuel and leading to the formation of soot, which is removed with the exhaust gases.

Thus, only a fraction of the potential calories injected into the operative cycle serves for actual work.

In order to remove such drawbacks, the present invention provides means for limiting the heat stored in the walls of the heat insulated combustion chamber as obtained by the exhaust of a predetermined fraction of said heat into the cooling water circuit, the conditions and means for said exhaust being disclosed hereinafter. Of course, said fraction of heat to be exhausted varies and depends on the average conditions of operation of the engine, that is on the average desired operative pressure which is to prevail during the cycle for an average piston speed equal at a maximum to 11 meters per second and it also depends on the overlapping of the periods during which the valves open; said fraction should be such that the maximum temperature at the exhaust may be of a magnitude of 600° C. To this end, the invention has for its object an internal combustion engine incorporating a thermically insulating combustion chamber and, according to the present invention, contact areas of a predetermined area depending on the average operative pressure corresponding to the average speed selected for the engine, are designed so as to thermally connect the outer wall of the combustion chamber with the adjacent portions of the engine.

The accompanying drawings illustrate a preferred embodiment of the invention and in said drawings.

Figure 1:
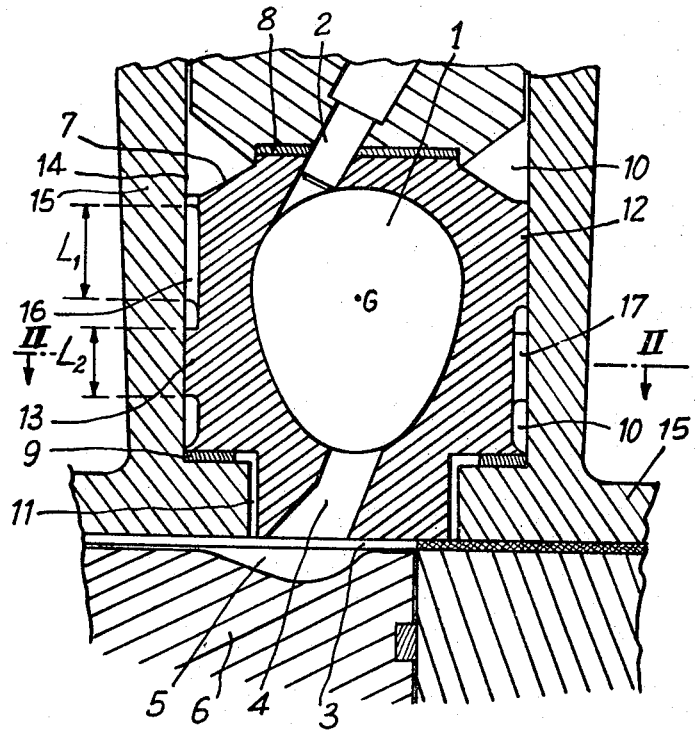
FIG. 1 is a sectional view through its plane of symmetry of a combustion chamber according to the invention.
Figure 2:
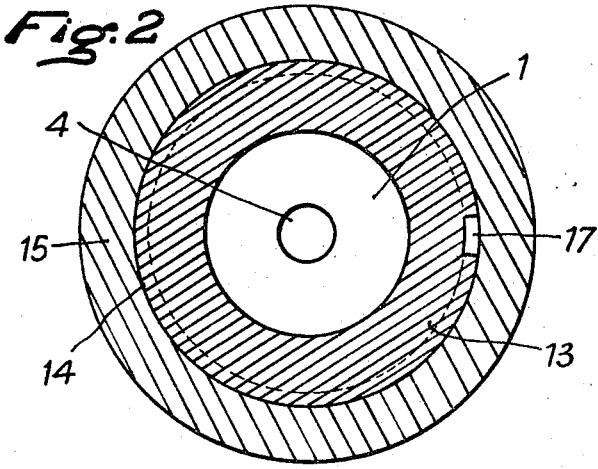
FIG. 2 is a sectional view through line II—II of said chamber.

As illustrated in FIGS. 1 and 2, an egg-shaped combustion chamber 1 is provided at its upper end with an injection port 2 through which it communicates with a transverse channel 4 opening into the corresponding cylinder 3 in registry with a transfer recess 5 formed in the operative surface of the piston 6. The outer wall 7 of the chamber body is held out of contact with the adjacent sections of the engine by gaskets 8 and 9 which define, on the one hand, a closed and sealed annular space 10 surrounding the chamber body and, on the other hand, define a gap 11 opening in registry with the cylinder 5. The space 10 is subjected according to a conventional procedure to a partial vacuum through a flap valve which is not illustrated. Annular projections, the number of which may vary and which is equal to two in the example illustrated are fitted as shown at 12 and 13 round the outer wall 7 of the chamber body or are formed by machining in said outer wall. The arrangement is such that said projections extending across the annular space 10 engage through their outer peripheral surfaces the inner wall 14 of a bore or recess in the cylinder head 15. Each of said annular projections 12 and 13 is slotted radially as illustrated respectively at 16 and 17, said slots 16 and 17 are opposed and are longitudinally intersected by a common diametrical plane of the combustion chamber; in the example illustrated, said plane forms the plane of symmetry of the chamber. The geometrical center of gravity G of the contacting surfaces between the projections 12 and 13 and the inner wall 14 of the cylinder head 15 registers substantially with the main heat focalizing point inside the combustion chamber.

The chamber thus designed is such that the amount of heat stored in its walls is limited since a fraction of said heat radiates towards the cooling water through the wall of the cylinder head. This prevents, on the one hand, an excessive increase in temperature during the operative cycle and consequently reduces the temperature of the exhaust gases which should never rise above 600° C. and, on the other hand, it prevents an excessive overheating at the end of the cycle inside the chamber, chiefly in the vicinity of the heat focalizing point since such an overheating would lead to a carbonization of the fuel droplets and consequently, as already mentioned, to the formation of soot to be carried along into the exhaust with the burnt gases. The annular arrangement of the projections and the communication between the sections of the closed sealed space 10, separated by the two projections as provided by the diametrically opposed radial slots 16 and 17 ensures uniformity of temperature through conductivity throughout the closed and sealed space 10 wherein the air pressure has been reduced down to a substantial vacuum. This eliminates the risk of an undesired modification in the amount of heat radiated towards the cooling water by the formation of locally superheated zones.

D being the diameter of the inner wall 14 of the cylinder head and $L_1$ and $L_2$ the heights of the annular projections 12 and 13 respectively, the total heat-conducting surface between the combustion chamber and the cylinder head is given by the formula $$Sc = \pi \times D \times (L_1 + L_2)$$

The optimum ratio between said contacting area and the area of the inner geometrical surface of the combustion chamber from which the cross-sectional area of the ports should not be subtracted has been defined experimentally for a combustion chamber of a standard thickness, that is a thickness ranging between 15 and 17% of the maximum radius of the chamber and the value of which depends on the average operative pressure during the cycle and on the coefficient of conductivity of the material forming the chamber body. Said ratio is given by the approximate formula $$\frac{Sc}{S_i} = \frac{6}{100}\left(1 + \frac{Pme-7}{15} \times \frac{1}{K}\right) = \left[\frac{6}{K}\left(1 + \frac{Pme-7}{15}\right)\right]\%$$

wherein $Sc$ is the total contacting area, $S_i$ is the area of the internal geometrical surface of the chamber, $Pme$ the average operative pressure in kg./sq. cm. and $K$ is the coefficient of conductivity of the material forming the chamber body.

Figure 3:
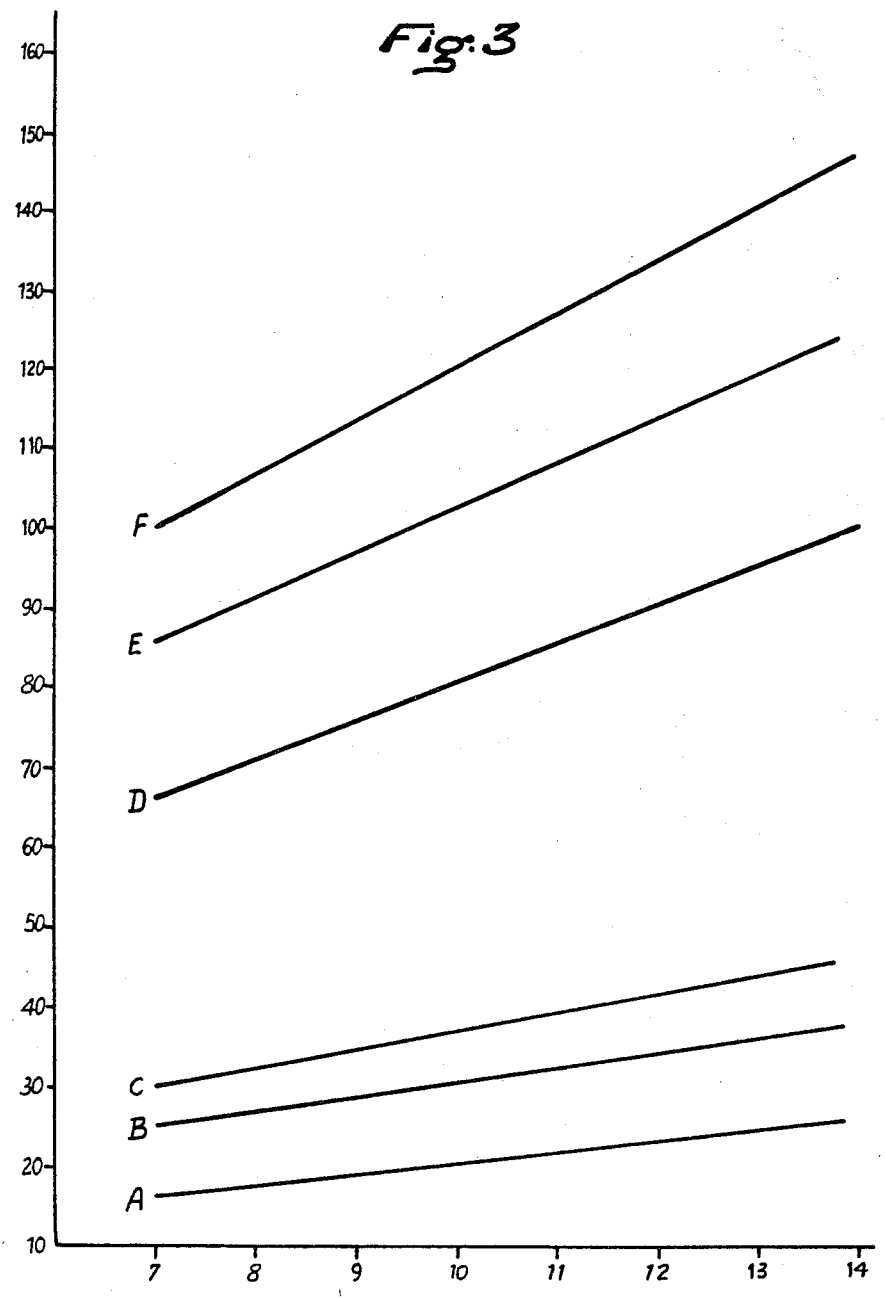
FIG. 3 is a nomogram for determining the value of the function $Sc=f(S_i)$ to be discussed hereinafter for various usual materials forming the contacting parts provided in accordance with the invention.

The experimental data which lead to said approximate formula are shown in a nomogram illustrated in FIG. 3 for various conventionally used materials. In FIG. 3 the abscissa indicates the values of $Pme$ in kg./sq. cm., while the ordinate shows the ratio $S_c/S_i$ in percentages.

Thus, starting from a chamber of a predetermined shape and internal volume and consequently wherein its inner geometrical surface has a predetermined area $S_i$ while $Pme$ values are known as defined by the average engine running conditions to be contemplated, it is sufficient to refer to that curve of the nomogram illustrated in FIG. 3 which corresponds to the material actually forming the chamber body when it is desired to ascertain the total area $S_c$ of the contacting surface and consequently the sum $$L_1 + L_2 = \frac{Sc}{\pi D}$$

of the heights of the annular projections to be formed. The portioning of $L_1$ and $L_2$ out of their sum $L_1+L_2$ and the spacing between the two projections are then defined in a manner such as to cause the geometrical center of gravity of said projection to coincide with the main heat focalising point inside the combustion chamber.

It is simpler to form the annular projections directly by machining the mass of the body in which the combustion chamber is formed but it is also possible, without widening the scope of the invention as defined in the accompanying claims, to fit slotted rings as ferrules or hoops round the outwardly cylindrical chamber body, said rings being made of a material identical with or different from that serving for the execution of the actual chamber body. In the latter case, the value of the coefficient K to be used in the approximate formula $Sc=f(S_i)$ should be the arithmetical average of the coefficient of conductivity of the different materials forming the chamber body and the rings. From the value obtained about 30% should be subtracted so as to take into account the screen formed by the joint between the projecting rings and the outer wall of the chamber body.

It is important to provide between the annular projections and the inner wall of the cylinder head a true contact. For this purpose the clearance which is essential for the assembly of the parts, between the outer peripheral surface of the projections and the inner wall of the cylinder head, should range between 0.0030 and 0.0035 mm., for each cm. of the outer diameter of the combustion chamber body.

In FIG. 3, the curves showing the ratios $Sc/S_i$, expressed in percentages and as functions of the average operative pressure given by the approximate formula written out hereinabove, have been drawn for the following materials (the K values are given in parentheses):

Refractory aluminium alloy ($Ka=0.38$) curve A,
Treated refractory bronze ($Kb=0.24$) curve B,
Untreated refractory bronze ($Kc=0.20$) curve C,
Refractory steel with a bronze hoop ($Kd=0.09$) curve D,
Refractory chromium molybdenum cast iron ($Ke=0.07$) curve E,
Refractory steel ($Kf=0.06$) curve F.

The ratio of the total area of the contacting surfaces between the annular projections and the adjacent sections of the cylinder head of the engine with reference to the inner geometrical area of the chamber 1 is, for average operative pressures of respectively 7–10.5 and 12.5 kg./sq. cm. equal to:

16–28.5 and 23% for refractory aluminium,
25–29 and 35% for treated refractory bronze,
30–35 and 42% for untreated refractory bronze,
86–95 and 116% for refractory chromium-molybdenum cast iron,
100–115 and 138% for refractory steel.

As already mentioned hereinabove, the value of the coefficient $Kd$ used for refractory steel with a bronze hoop (curve D) is equal to the arithmetical average of the coefficients of conductivity of refractory steel on the one hand and of refractory bronze on the other hand, reduced by 30%. In other words, $$Kd = \frac{0.06 + 0.20}{2} \times 0.7 \neq 0.09$$

Thus in the case of an engine having a cylinder bore of 120 mm. and an operative piston stroke equal to 140 mm. and including combustion chambers the body of which is made of refractory steel and each of which is provided in the machining with annular projections in contact through their peripheral surfaces with the cylinder head over an area equal to 107% of the inner geometrical surface of the chamber so as to correspond in accordance with the approximate above-disclosed formula to running conditions for which the average operative pressure is substantially equal to 8.100 kg., the following results have been obtained:

| Number of revolutions | Power in HP | Pme, kg./sq. cm. | Consumption in grs. per HP and per hour | Exhaust Temp. | Color |
|---|---|---|---|---|---|
| 800 | 38 | 6.78 | 172.5 | 410 | Light green. |
| 1,190 | 61 | 7.3 | 169 | 450 | Very light green. |
| 1,500 | 85.5 | 8.12 | 171.5 | 535 | Colorless. |
| 1,800 | 105.3 | 8.36 | 173 | 580 | Do. |
| 1,995 | 117.5 | 8.35 | 175.5 | 610 | Do. |
| 2,105 | 121 | 8.2 | 175 | 620 | Do. |

The increase in power at 1800 r.p.m. with reference to conventional engines is thus equal to about 10% for a substantially equal consumption of fuel.

Furthermore, for the extreme sections of the operative curve defining the engine performances, the consumption remains approximately that is obtained for optimum running conditions and which is equal, in the present case, to 173 grs., whereas in conventional engines it increases considerably for such extreme conditions.

Lastly, as soon as the speed of 1800 r.p.m. is reached, the exhaust fumes disappear completely.

I claim:
1. In an internal engine of the type including a plurality of cylinders each topped with a cylinder head through which coolant is circulated, the improvement comprising:
    (a) combustion chambers each communicating with one of said cylinders and disposed thereabove in a bore of said cylinder head, each said combustion chamber being out of direct contact with said coolant and so disposed in said bore as to define an air space between the outer wall of said chamber and the inner wall of said bore,
    (b) heat conducting means for thermally connecting the outer wall of said chamber with the inner wall of said bore to control the temperature within said combustion chamber, said heat conducting means providing an area of contact between said outer wall and said inner wall, said area being predetermined as a function of the average operative pressure corresponding to the average running conditions of said engine.

2. An internal combustion engine as claimed in claim 1, wherein said inner wall and said outer wall facing each other are cylindrical and said heat conducting means are constituted by at least two spaced annular projections surrounding and in contact with said outer wall and engaging said inner wall, said projections dividing said space into a plurality of compartments.

3. An internal combustion engine as claimed in claim 1, wherein said heat conducting means are constituted by at least two spaced annular projections surrounding and in contact with said outer wall and engaging said inner wall, said projections being provided with radial slots interconnecting said air space divided by said projections.

4. An internal combustion engine as claimed in claim 3, wherein said radial slots of two successive projections are axially staggered and are longitudinally intersected by a common imaginary diametrical plane of the combustion chamber.

5. An internal combustion engine as claimed in claim 2, wherein the geometrical center of gravity of the areas of said inner wall in contact with said projections substantially coincides with the main heat-focalizing point inside the combustion chamber.

6. An internal combustion engine as claimed in claim 2, wherein said combustion chamber has a wall thickness ranging between about 15 and 17% of its maximum inner radius, the total area of the contacting surfaces between said annular projections and said inner wall is given by the formula $$Sc = 6\left(1 + \frac{Pme - 7}{15}\right) \times \frac{1}{K} \times \frac{S_i}{100}$$

wherein $Sc$ is the total area of the said coating surfaces, $S_i$ the area of the inner geometrical surface of the combustion chamber, $K$ the coefficient of heat conductivity for the material forming said chamber and $Pme$ the average operative pressure during the cycle measured in kg./sq. cm.

References Cited

UNITED STATES PATENTS

| | | | |
|---|---|---|---|
| 2,619,078 | 11/1952 | Witzky et al. | 123—41.82 |
| 2,788,776 | 4/1957 | Holt | 123—41.82 |
| 3,082,751 | 3/1963 | Kuntz | 23—32 |
| 3,259,116 | 7/1966 | Bricout | 123—32 |
| 3,263,659 | 8/1966 | Francois | 123—32 |

LAURENCE M. GOODRIDGE, *Primary Examiner.*

UNITED STATES PATENT OFFICE
CERTIFICATE OF CORRECTION

Patent No. 3,398,726                              August 27, 1968

Constant Bricout

It is certified that error appears in the above identified patent and that said Letters Patent are hereby corrected as shown below:

Column 6, line 25, "coating" should read -- contacting --.

Signed and sealed this 3rd day of February 1970.

(SEAL)
Attest:

Edward M. Fletcher, Jr.                       WILLIAM E. SCHUYLER, JR.
Attesting Officer                                Commissioner of Patents